(12) United States Patent
Martinsen et al.

(10) Patent No.: US 9,790,451 B2
(45) Date of Patent: Oct. 17, 2017

(54) SYSTEM AND METHOD FOR EXTRACTING OIL FROM PLANT MATERIALS

(71) Applicants: Bruce Martinsen, Wheat Ridge, CO (US); Shayne Martinsen, Oakland, CA (US)

(72) Inventors: Bruce Martinsen, Wheat Ridge, CO (US); Shayne Martinsen, Oakland, CA (US)

( * ) Notice: Subject to any disclaimer, the term of this patent is extended or adjusted under 35 U.S.C. 154(b) by 0 days.

(21) Appl. No.: 14/873,361

(22) Filed: Oct. 2, 2015

(65) Prior Publication Data

US 2016/0122685 A1    May 5, 2016

Related U.S. Application Data

(60) Provisional application No. 62/059,715, filed on Oct. 3, 2014.

(51) Int. Cl.
| | |
|---|---|
| *B01D 11/00* | (2006.01) |
| *C11B 1/00* | (2006.01) |
| *C11B 1/10* | (2006.01) |
| *B01D 11/02* | (2006.01) |

(52) U.S. Cl.
CPC ............ *C11B 1/10* (2013.01); *B01D 11/0265* (2013.01)

(58) Field of Classification Search
CPC .................................................. B01D 11/0265

USPC ......................................................... 202/168
See application file for complete search history.

(56) References Cited

U.S. PATENT DOCUMENTS

| 8,445,034 B1 | 5/2013 | Coles, Jr. | |
|---|---|---|---|
| 2010/0192007 A1* | 7/2010 | Tarra | G06F 11/1433 714/6.12 |
| 2014/0121391 A1 | 5/2014 | Murphy | |

FOREIGN PATENT DOCUMENTS

| RU | 96121 U1 * | 7/2010 |
|---|---|---|
| WO | WO9919425 A1 * | 1/1999 |

* cited by examiner

*Primary Examiner* — Deborah D Carr
(74) *Attorney, Agent, or Firm* — Ariel S. Bentolila; Bay Area IP Group LLC

(57) ABSTRACT

A plant oil extraction system may include a reservoir tank, an agitator tank, a boiler tank, a condenser unit, and a vacuum chamber. The reservoir tank may hold a solvent to be used in the system process. The solvent may be deposited into the reservoir tank through a fill port. A pump may transfers the solvent from the reservoir tank to the agitator tank. The agitator tank may hold dry plant matter. The agitator tank may separate oil from the plant matter by use of solvent where the mixture of solvent and plant oil drains to the boiler tank. The boiler tank comprise of a tank stack (condenser) used for separating extracted plant oil from the solvent by boiling off the solvent and a vacuum chamber used to extract residual solvent from the oil.

21 Claims, 10 Drawing Sheets

SYSTEM AND METHOD FOR EXTRACTING OIL FROM PLANT MATERIALS

CROSS-REFERENCE TO RELATED APPLICATIONS

The present Utility patent application claims priority benefit of the [U.S. provisional application for patent Ser. No. 62/059,715 entitled "Earth Grease Plant Oil (Concrete) Extraction Apparatus", filed on 3 Oct. 2014, under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to processing plant materials. More particularly, the invention relates to a plant oil extraction apparatus.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. It is believed that there are many uses for plant oil including, but not limited to, uses for health, beauty, recreation, etc. For example, without limitation, the consumption of some plant oils may aid in promoting cellular health, may help to lower cholesterol levels, may boost the immune system, may help fight chronic inflammatory conditions such as, but not limited to, rheumatoid arthritis, etc. In addition, some plant oils may be used as additives in cosmetic and skin care products such as, but not limited to, soaps, lotions, lip balms, etc. Some individuals claim that various different plant oils may have specific therapeutic properties suitable for different skin types or conditions; for example, without limitation, lavender oil may help soothe and heal sunburns, coconut oil may help moisturize the skin, argan oil may provide anti-aging benefits, etc. Due to the assertions of these benefits, one can expect that the cost of and demand for commercial plant oils with respect to health and beauty purposes may be high. Furthermore, many plant oils, particularly those from herbs and flowers may be used to scent various different items such as, but not limited to, perfumes, candles, cosmetics, etc. Yet other plant oils may be used for mechanical uses including, without limitation, as lubricants or as biofuel.

By way of educational background, an aspect of the prior art generally useful to be aware of is that there are currently some processes and apparatuses available for extracting oil from plants including, without limitation, large commercial operations and small scale DIY methods. For example, without limitation, one embodiment teaches a device that peculates a solvent over herbs or other plant material. Then, the solvent may eventually evaporate from the system. In other methods, plant oil may be obtained by thrashing and boiling plant materials in solvents, which are typically flammable. This may enable the solvents to evaporate into the atmosphere, which may, as in other methods in which the solvent evaporates into the atmosphere, cause pollution and may create a fire or explosion hazard. Moreover, these processes may be wasteful as the solvent that evaporates into the atmosphere typically cannot be recovered for reuse and may also leave excessive unwanted residual solvents within the final product. There are also some currently available extractors based on super critical butane or carbon dioxide at high pressure, which are typically not safe for home use. Furthermore, these methods of solvent plant oil extraction may be time consuming and typically require many steps and parameters and many opportunities for mistakes such as, but not limited to, spills. Also, these methods typically utilize mechanical mixing, which often does not produce optimum amounts of oil.

The product of solvent extraction may be referred to as concrete, which is typically a semi-solid mass obtained by solvent extraction of fresh plant material. This product may also be referred to as plant oil or earth grease.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a front perspective view. FIG. 3B is a diagrammatic left side view. FIG. 3C is a diagrammatic rear view, and FIG. 3D is a diagrammatic right side view.

FIG. 4A is a diagrammatic front view. FIG. 4B is a diagrammatic left side view. FIG. 4C is a diagrammatic rear view. FIG. 4D is a diagrammatic right side view, and FIG. 4E is a diagrammatic top view.

Figure 1:
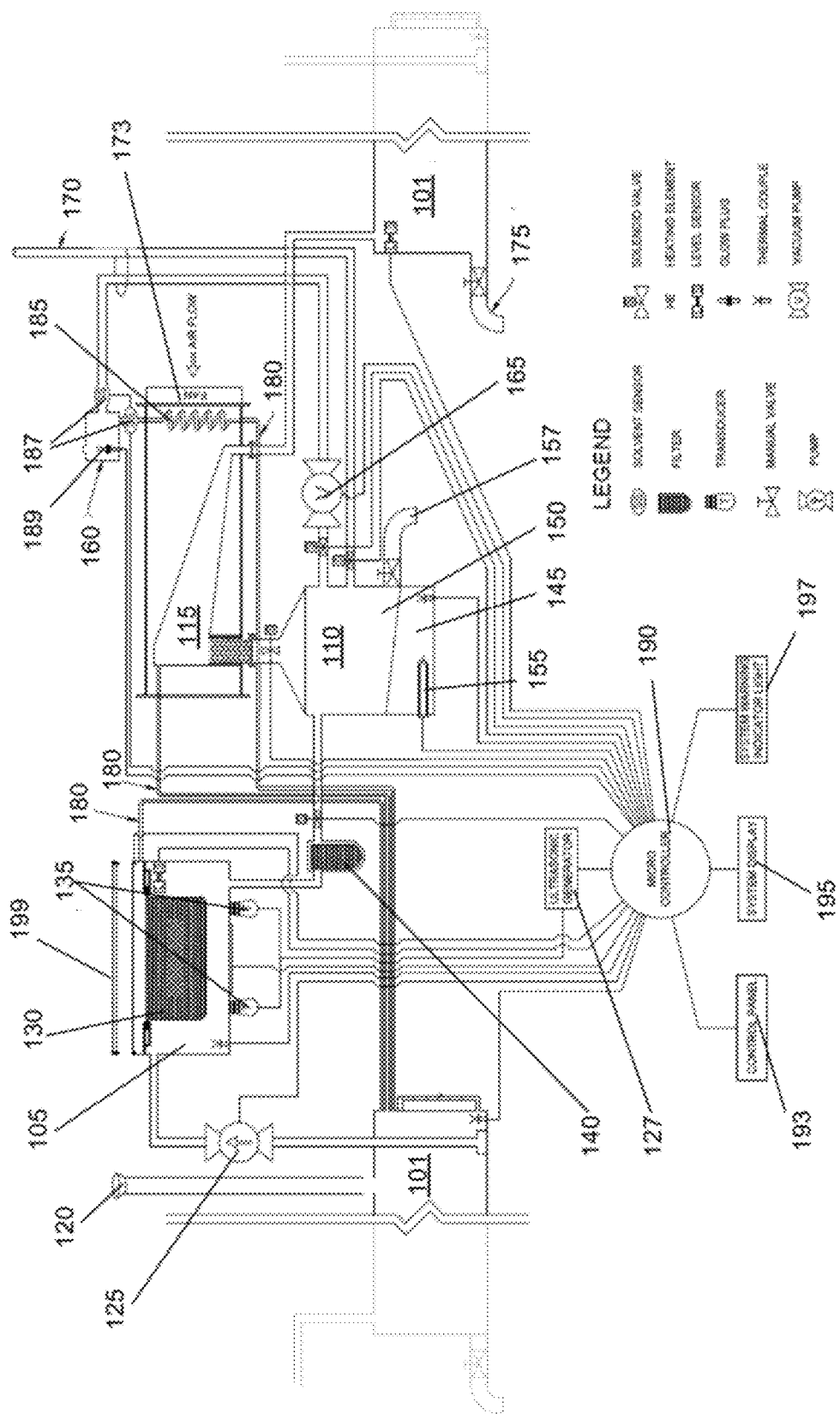
FIG. 1 is a diagram illustrating an exemplary plant oil extraction system, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term 'comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of" and "consisting essentially of" where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/ dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

One embodiment of the present invention may provide an automated, safe to use, closed loop, small scale plant oil extraction apparatus. The oil or concrete extracted by this apparatus may be used for a multiplicity of suitable uses including, but not limited to, for health, beauty, or recreation. In some embodiments the apparatus may comprise a control system and user interface that may enable a user to control and monitor time and environments within the apparatus appropriate for processing unique plant materials.

FIG. 1 is a diagram illustrating an exemplary plant oil extraction system, in accordance with an embodiment of the present invention. In the present embodiment, the system comprises a reservoir tank 101, an agitator tank 105 a boiler tank 110, and a condenser unit 115. Reservoir tank 101 may hold a solvent to be used in the system process. The solvent may be deposited into reservoir tank 101 through a fill port 120 or optionally a pre-filled reservoir cartridge may be mechanically attached to the solvent input and solvent output within the apparatus. In some embodiments fill port 120 may comprise a fill port sensor indicating whether the fill port 120 is open or closed, a sight glass to determine fill level, and a fill level sensor to determine fill level during operation. Some alternate embodiments may be implemented without fill sensors and/or a sight glass. In the present embodiment, a solenoid valve and a pump 125 may transfer the solvent from reservoir tank 101 to agitator tank 105. Reservoir tank 101 may also act as a venting buffer allowing the venting gases from the various components condensate as well as vapor by density, this will aid in allowing mostly air venting in the burn-off. When the pump stars to transfer the solvent from tank 101 to 105 the air being displaced in 105 replaces the volume of fluid leaving 101, this transfer of liquids and gases continues throughout the process we could refer to the reservoir during these processes as a vent plenum.

Agitator tank 105 may comprise of an ultrasonic generator 127 to produce vibrations that may be used to agitate plant matter and solvent within agitator tank 105 to produce a plant oil/solvent solution. The plant matter may be placed in a filter bag 130 within agitator tank 105, which may typically enable the plant oil to be extracted from the plant matter while helping to prevent the plant matter from moving on to later stages of the process. It is contemplated that filter bag 130 may be made of a multiplicity of suitable materials including, without limitation, paper, plastic mesh, cheesecloth, other fabrics, etc. Optionally, agitator tank 105 may comprise a filter bag clip assembly for holding filter bag 130. The clips may be fixed to the frame of the apparatus and not to agitator tank 105. Alternately, in some embodiments the clips may be fixed to agitator tank 105 or may be omitted. In some alternate embodiments the plant matter may be placed in the agitator tank without a filter bag, and the plant matter may be removed from the plant oil/solvent solution by a filter at or the exit of the agitator tank or outside the agitator tank, a straining mechanism within the agitator tank, separation chamber, etc. In the present embodiment, since agitator tank 105 vibrates to blend the plant matter and solvent, the agitator tank 105 may be placed on a movable surface such as, but not limited to rubber padding, an air cushion, springs, etc. This may help to ensure that the ultrasonic vibration stays within agitator tank 105 and is not transferred to the apparatus as a whole. In some alternate embodiments, the agitator tank may be mounted outside the apparatus as a whole to help preserve the energy of the vibrations. In the present embodiment, agitator tank 105 may comprise two transducers 135 fixed to the bottom surface that are connected to the ultrasonic generator. The ultrasonic generator and transducers convert electrical energy into ultrasonic vibration. (The transducers could be omitted from the current embodiment if the agitation was to occur mechanically such as auger agitation or motor driven thrasher, etc). Those skilled in the art will readily recognize, in light of and in accordance with the teachings of the present invention, that a multiplicity of suitable means for mixing the contents of the agitator tank may be used in some embodiments including, without limitation, mechanical agitators such as, but not limited to, moving paddles for thrashing and/or mixing, an internal auger mixer, shaker, blender, mounting the agitator tank to a rocking table, etc. In the present embodiment, a heater may also be fixed to agitator tank 105 along with a temperature sensor for heat control. Some alternate embodiments may be implemented without a heater or temperature sensors. In the present embodiment, a solenoid valve may enable a gravity feed of plant oil/solvent solution to enter boiler tank 110. In addition, a filter 140, for example, without limitation, a 10+/− micron filter, may be placed between agitator tank 105 and boiler tank 110 to capture plant matter that may have escaped filter bag 130. A flow meter will be placed after the filter to gauge when the filter will need to be changed. It is contemplated that this filter may be omitted in some embodiments.

In the present embodiment, boiler tank 110 may be comprised of a tank stack typically used for separating the extracted plant oil from the solvent by boiling off the solvent. Boiler tank 110 may be configured as a two level tank with an oil chamber 145 in the bottom portion and a solution chamber 150 in the top portion. Oil chamber 145 may be filled with oil with a heating element 155 submerged within to typically provide safe, controlled, uniform heat to the entire bottom surface of solution chamber 150 above. Oil chamber 145 may also comprise a temperature sensor for heat control. Solution chamber 150 is typically where the solution enters boiler tank 110 from agitator tank 105 and where the solution may be boiled to separate the solvent from the plant oil. The separated plant oil may then be removed from boiler tank 110 for use through a drain 157, which may be opened or closed with a manual or solenoid valve. Optionally the boiler tank may be completely removed from the apparatus or a tray removed so that the plant oil may be retrieved. It is contemplated that some embodiments may be implemented with a single tank boiler in which a heating element is submerged in the solution itself or placed on the outside of the boiler. In the present embodiment, condenser 115 may be attached directly to the top of boiler tank 110. Boiler tank 110 may be attached to the input with a union and to the stack (which is the base containing packing material) with a quick release clamp to typically allow easy removal and cleaning of boiler tank 110. In some embodiments various different types of attachment means may be used to connect the boiler tank to the system in some embodiments including, without limitation, threaded connectors, rubber fittings, welding, etc. In the present embodiment boiler tank 110 may optionally be isolated (by a solenoid valve between the stack and the quick release valve) at the end of the condensing process and converted into a vacuum chamber for the removal of residual solvents from the plant oil extract by connecting boiler tank 110 to a burn-off box 160 on condenser 115 with a vacuum pump 165 and providing vacuum relief means 170 from the atmosphere through the boiler tank 110. Some embodiments may be configured without this vacuum purge feature.

In the present embodiment, condenser 115 may be used to condense solvent vapors coming from boiler tank 110 back into liquid. At the entrance of condenser there may be a packing area filled with a packing media, for example, without limitation, stainless steel wool, that may provide additional surface area to separate the oil from the solvent so that the plant oil typically remains in boiling tank 110. A fan 173 may be attached to the condenser 115 to force outside air over condenser 115 to draw heat from condenser 115 and to typically cool the solvent vapor so that it may condense into liquid solvent. The condensed solvent moves down condenser 115 to an exit and returns to reservoir 101 by gravity for reuse. The solvent may also be drained from reservoir 101 through a drain 175, for example, without limitation, for disposal or for use in another application. Drain 175 may be opened or closed by a manual or solenoid valve. In some alternate embodiments the condenser may include a larger outer tube, with a core of several smaller tubes running through it. The cluster of small tubes are sealed at the ends by two plates with o-rings between the plates and tubes, which make a seal. The small tubes are then set, with some distance between them, inside the larger tube and sealed with perforated plates and gaskets to make the seal between the core of small tubes and the larger outer tube. A fan may be configured to push air through the small tubes condensing the solvent vapors on their exterior and within the confines of the larger outer tube. The vapor inlet, the liquid exit, and vent on the larger outer tube remain the same or similar to the foregoing condenser design embodiment. This is contemplated to enable a more effective heat exchange and therefore would tend to provide for a faster condensing of the vapors. In yet another alternate embodiment, the solvent may be configured to exit the system for disposal directly from the condenser after being converted back into liquid rather than being returned to the reservoir tank.

In the present embodiment, the system comprises venting means that may relieve any pressure that might accumulate in the system due to heat prior to entering burn-off box 160. The venting means comprises small diameter conductive venting tubes 180 that may connect agitator tank 110 and condenser 115 to reservoir tank 101. Reservoir tank 101 is vented to the atmosphere through burn-off box 160. This may enable excess pressure to escape the system in a typically safe manner. A condensation coil 185 in vent tubing 180 may be located in condenser 115 which may trap solvent vapor that makes its way through the vent system and may enable the vapor to condense and return to reservoir tank 101 prior to entering burn-off box 160. Condensation coil 185 in vent tubing 180 may allow for the internal expansion and contraction of the air inside the system while typically not enabling solvent to evaporate into the atmosphere. Burn-off box 160 is a small box surrounded by fire walls which may be located at the end of the venting system. Solvent sensors 187 may be placed at the connections between burn-off box 160 and condensation coil 185 and vacuum release means 170 that may be able to actuate a heating element 189 in burn-off box 160. If solvent vapor is sensed in burn-off box 160, heating element 189 may be ignited to burn off the vapor before the vapor enters the atmosphere. In some embodiments, the burn-off box may be operated on a timed basis, without the use of solvent sensors.

In the present embodiment, the plant oil extraction apparatus may comprise a micro controller 190 to control systems functions including, without limitation, ultrasonic generator 127, tank level sensors, solvent sensors 187, heat sensors, solenoid valves, pumps, heating elements 155 and 189, tank heaters, fan 173, vacuum pump 165, a control panel 193, a system display 195, system indicator lights 197, etc. Control panel 193 may comprise a multiplicity of suitable system inputs such as, but not limited to, an on/off switch, control knobs, a start buttons, timers, temperature settings, etc.

Those skilled in the art will readily recognize, in light of and in accordance with the teachings of the present invention, that many materials suitable for maintaining the heat associated with the system without being corroded by the solvent being used within the system may be used in the construction of the various elements of the extraction apparatus. For example, without limitation, stainless Steel may be a desirable material for most components; yet other materials may also be used such as, but not limited to, wood, brass, aluminum, polypropylene, PVDF, various different plastics, etc. Furthermore, the types of valves used in some alternate embodiments may also vary. For example, without limitation, manual valves may be used in some embodiments rather than solenoid valves. Moreover, it is contemplated that various different types of sensors may be used for measuring many different properties such as, but not limited to, temperature, solvent detection, solvent content, solvent levels, solution levels, oil levels, pressure, flow rate, organic composition, etc.

In typical use of the present embodiment, the extraction apparatus may be used as a fully automated system for the extraction of plant oil from plant matter for consumer or small facility use. Prior to using the apparatus, plant matter is typically dried, pulverized, put into filter bag 130 and placed into agitator tank 105. A lid 199 may then be placed on agitator tank 105 and secured. Lid 199 may comprise locks and locking sensors to typically ensure that agitator tank 105 is securely closed. Alternate embodiments may be implemented without locks and/or locking sensors. In the present embodiment once the apparatus is started pump 125 may transfer solvent from reservoir tank 101 to agitator tank 105 where a level sensor may communicate to pump 125 to stop once agitator tank is filled to an appropriate level. Some alternate embodiments may be configured so that the pump runs for a predetermined amount of time to fill the agitator tank. Starting the apparatus also activates ultrasonic generator 127 and a heater in agitator tank 105. As the plant matter in filter bag 130 is agitated in the heated solvent, plant oil may be extracted from the plant matter to combine with the solvent in a solvent/oil solution. It is believed that this method of Ultrasonic Assisted Extraction (UAE) using heated solvent may produce a high yield of plant oil. Yet, some embodiments may comprise various different types of agitation means other than ultrasonic vibrations. Also, some embodiments may be implemented without heating means in the agitator tank. In the present embodiment, after a set period of time of agitation, ultrasonic generator 127 is deactivated and a solenoid valve on agitator tank 105 may be opened to drain the solvent/oil solution from agitator tank 105 into boiler tank 110 through filter 140, which may remove small particles of plant matter that may remain in the solution. It is contemplated that such a filter may be omitted from the apparatus in some alternate embodiments. Those skilled in the art will readily recognize, in light of and in accordance with the teachings of the present invention, that the solenoid valve controlling the flow of the solution from agitator tank 105 and boiler tank 110 may be placed on either side of filter 140. In some embodiments a valve may be placed each side of the filter. Moreover, a flow sensor/meter may be placed before and after the filter to gauge the flow going into the filter and out of the filter to indicate if the filter needs to be replaced.

In the present embodiment, heating element for boiler tank 110 may also be activated when the apparatus is started so that boiler tank 110 is typically at the proper temperature to boil the solvent once the solution reaches boiler tank 110. Boiler tank 110 may comprises two levels, sealed bottom level, oil chamber 145, comprising heating element 155 and a thermocouple to control temperature and upper level, solution chamber, 150 that typically holds the solution as it comes to a boil with the heat coming from oil chamber 145. Once the solution boils in solution chamber 150, the vaporizing solvent rises up through an open top port of boiler tank 110 and passes through packing material such as, but not limited to, stainless steel wool into condenser 115. The top port of boiler tank 110 may or may not comprise a solenoid or manual valve to control the flow of vapor from boiler tank 110.

Condenser 115 may pass through an outer housing of the apparatus and is typically insulated to separate the environment of condenser 115 form the rest of the apparatus. Fan 173 may force air from the outside of the apparatus over condenser 115, which may comprise multiple cooling fins as illustrated by way of example in FIG. 2. The heat from the boiling process is transferred through condenser 115 and out of the apparatus. This may enable the solvent within condenser 115 to convert from vapor to liquid. In the present embodiment, condenser 115 may be sloped downwardly to a tapered port where the condensed liquid solvent may return to reservoir 101 by gravity. While boiler 110 is working at the boiling point temperature of the solvent, the reservoir is typically being refilled with the condensed solvent from the vapor of the boiling solution. Once reservoir 101 is filled to a proper level, which may be detected by a tank level sensor, agitator tank 105 may be refilled by pump 125, and the cycle may begin again. Optionally the cycle may start on a timed basis within the program. The number of cycles run for a particular batch of plant matter may be preset with the use of micro controller 190 for maximum yield. The number of cycles may be chosen by the user using control panel 193. Alternately, the number of cycles may be determined by micro controller based on preprogrammed algorithms based on factors including, but not limited to, the type of plant matter, the amount of plant matter, the type of solvent, the amount of heat in the system, etc. Furthermore, many other parameters of the apparatus may be chosen by the user with control panel 193 or may be automatically determined by micro controller 190 such as, but not limited to, the temperature of agitator tank 105, the temperature of heating element 155, the appropriate level of reservoir 101, the speed of vibration from ultrasonic generator 127, the speed of pump 125, the type of solvent being used for sensor calibration, amount of vacuum pressure 165, level of solvent detection to initiate burn-off heating element 189, etc.

In the present embodiment, the apparatus is open to the atmosphere through the venting system that is attached to all of the components so the apparatus typically does not become pressurized. In addition, the apparatus typically does not use super critical fluids. A supercritical fluid is any substance at a temperature and pressure above its critical point, where distinct liquid and gas phases do not exist. It can effuse through solids like a gas, and dissolve materials like a liquid. To achieve these non-liquid or gas point sometimes high temp and pressure is needed, this creates the danger in the use of super critical fluids. The venting system comprises condensation coil 185 to typically prevent solvents from escaping the system. As a secondary safety precaution, burn-off box 160, may be located at the end of the venting system to burn up any solvent that makes its way through the venting system before the solvent can escape into the atmosphere. The heating element in the burn-off box is initiated when the solvent sensors 187 reads volatile levels of solvent. As the solvent passes through the venting system 180 or the vacuum system 165, to the insulated burn-off box 160 the heating element 189 inside the box ignites the solvent in a controlled manor to eliminate solvent fumes accumulating outside the apparatus. With these safety guards in place the apparatus may typically be operated virtually anywhere and in any ambient temperature, although the optimal temperature range for operation is believed to be between 20 F and 80 F. Optionally, after the apparatus has run the predetermined number of cycles, boiler tank 110 may be isolated from the other components of the system by manual or solenoid valves to be used as a vacuum chamber that may draw residual solvents from the plant oil remaining in boiler tank 110. To perform this vacuum purge, vacuum relief means 170 may be opened by a valve and may draw in air from the outside atmosphere through boiler tank 110 and out through vacuum pump 165 and a connected tube that leads to solvent sensor 187 and ultimately burn-off box 160. This movement of air may cause boiler tank 110 to be under vacuum pressure, which may be incrementally relieved to help maximize the elimination of residual solvents in the plant oil. Once solvent sensor 187 indicates that a desired solvent reading is coming from boiler tank 110, plant oil may be retrieved from boiler tank 110 through a drain 157. In the present embodiment, after the extraction cycles are complete, the temperature in boiler tank 110 may be lowered to maintain enough heat to typically prevent the extracted plant oil solidifying yet not too high to burn the plant oil.

Extraction apparatuses according to the present embodiment may provide safe and clean means to extract plant oil from plant matter with volatile solvents because the unit may be contained in a closed apparatus with a venting system and auxiliary burn-off box for fumes that would otherwise be released into the atmosphere. The venting systems may also help to prevent pressure from building up in the apparatus, which may lead to an explosion hazard. Many embodiments may also operate with no use of super critical fluids. Our embodiment operates at atmospheric pressure in a super critical fluid system could be as high as 20,000 psi this makes the responsibility of expert maintenance in the owners hands seals and component failure can be disastrous at these elevated pressures and temperatures. These extraction apparatuses also may comprise built in overrides to generally ensure correct operation for added safety. These overrides may include solvent sensors within the box to detect leaks, component check to ensure all components are operating properly, flow rate sensor to ensure fluids are passing through system, maximum and minimum temperatures, sensors to ensure that all compartments are closed and sealed, and that all levels are achieved when needed, etc. In addition, some embodiments may reduce waste of typically expensive solvents with the cyclical capture, reuse, and recovery of solvents using an efficient and compact condensing system comprising a cooling tube heat sink and conductive fins, as illustrated by way of example in FIG. 2.

Figure 2:
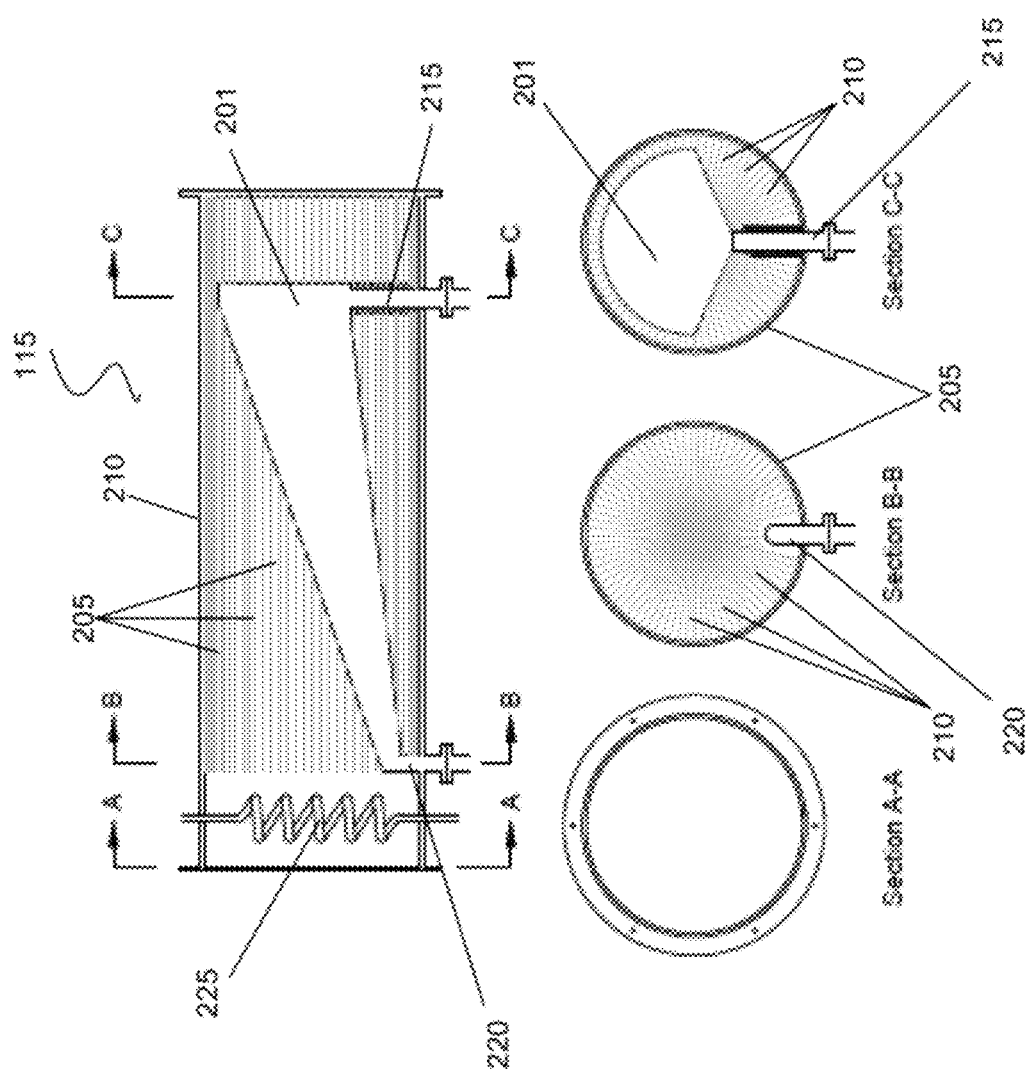
FIG. 2 illustrates an exemplary condenser for a plant oil extraction apparatus, in accordance with an embodiment of the present invention.

FIG. 2 illustrates an exemplary condenser 115 for a plant oil extraction apparatus, in accordance with an embodiment of the present invention. In the present embodiment a condenser unit 201 is located in an insulated pipe 205 that passes though the extraction apparatus. Insulated pipe 205 may act as a heat sink as there are many conductive fins 210 fixed between pipe 205 and condenser unit 201. A fan may be fixed to pipe 205 to force outside air though pipe 205 and over fins 210 which helps to draw heat from condenser unit 201, along fins 210, and to the outside atmosphere. This typically cools condenser unit to typically enable solvent vapor in condenser unit 201 to convert into liquid solvent. Typically, solvent vapor enters condenser unit 201 from a boiler tank through an entry port 215. Then, as the vapor condenses into liquid gravity pulls the liquid down the sloped interior of condenser unit 201 to an exit port 220. In addition, a condensation coil 225 of the venting system may pass through condenser 115 which may trap solvent vapor in the venting system and convert this vapor into liquid that may then return to a reservoir tank by gravity. It is contemplated that a multiplicity of suitable means of condensing may be used other than an air cooled system such as, but not limited to, chilled water passing through or over the condenser, electric chill plates fixed to the condenser, refrigeration units, etc. For embodiments configured as larger systems, chillers may be used.

Figure 3B:
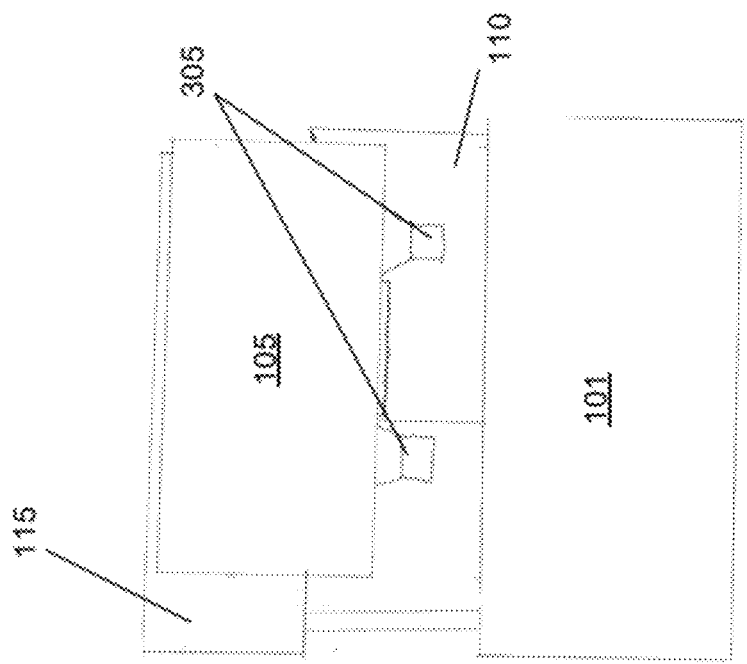
FIGS. 3A, 3B, 3C, and 3D illustrate an exemplary layout for the components of a plant oil extraction apparatus, in accordance with an embodiment of the present invention.
Figure 3A:
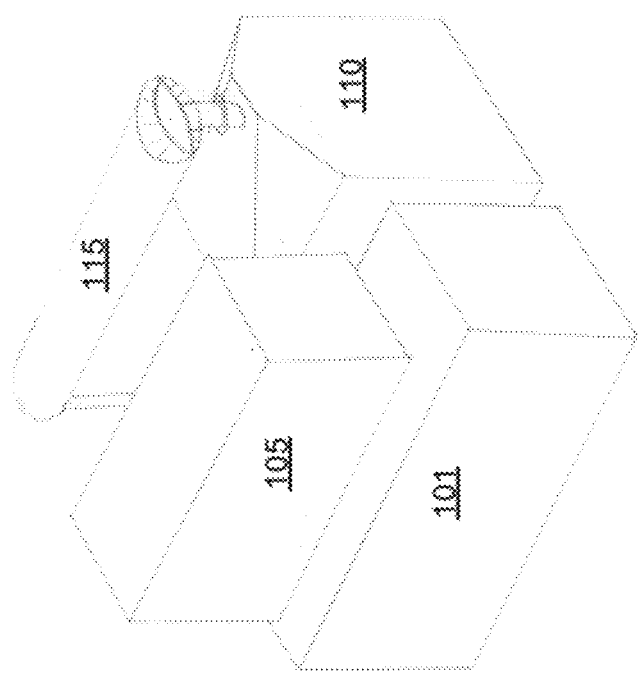
Figure 3C:
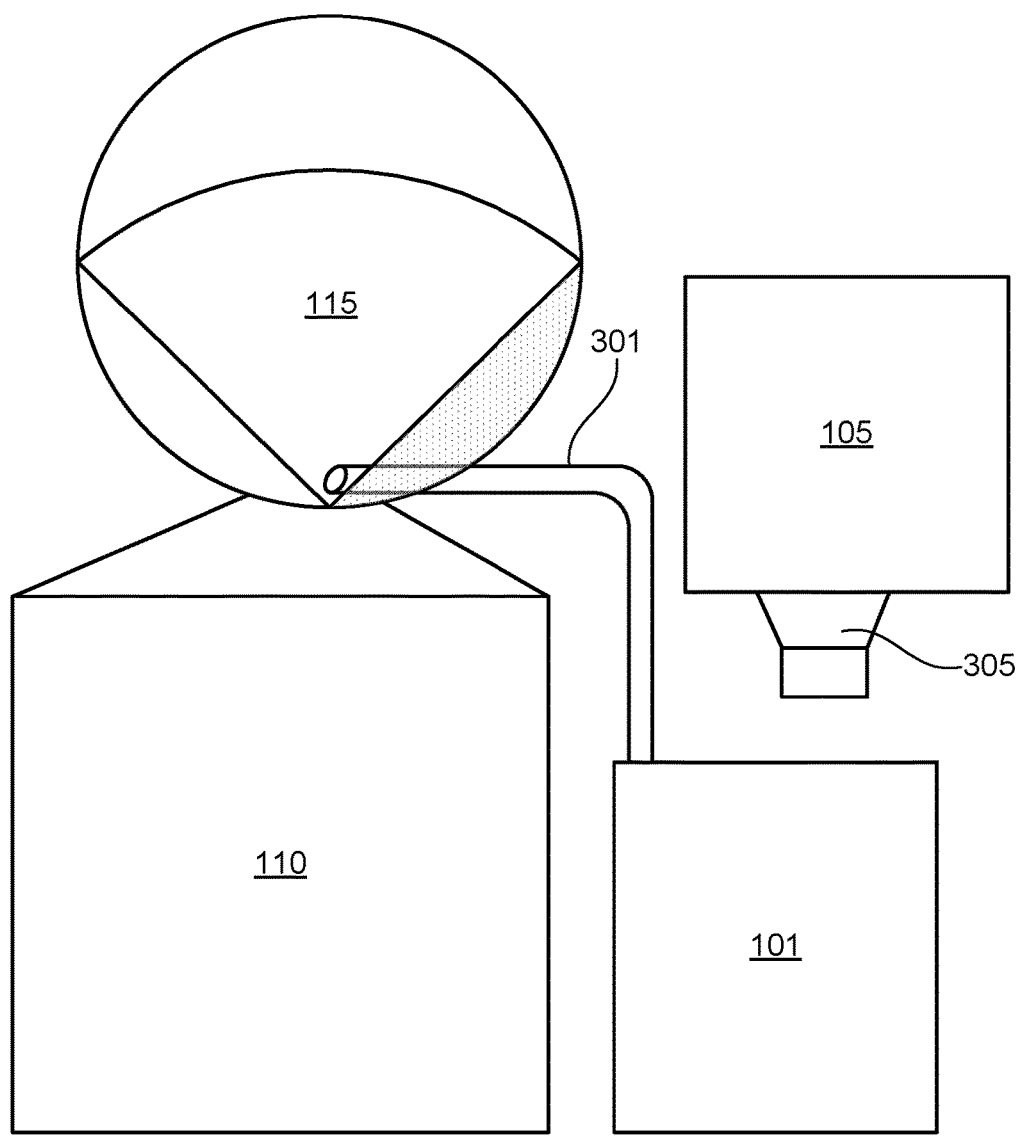
Figure 3D:
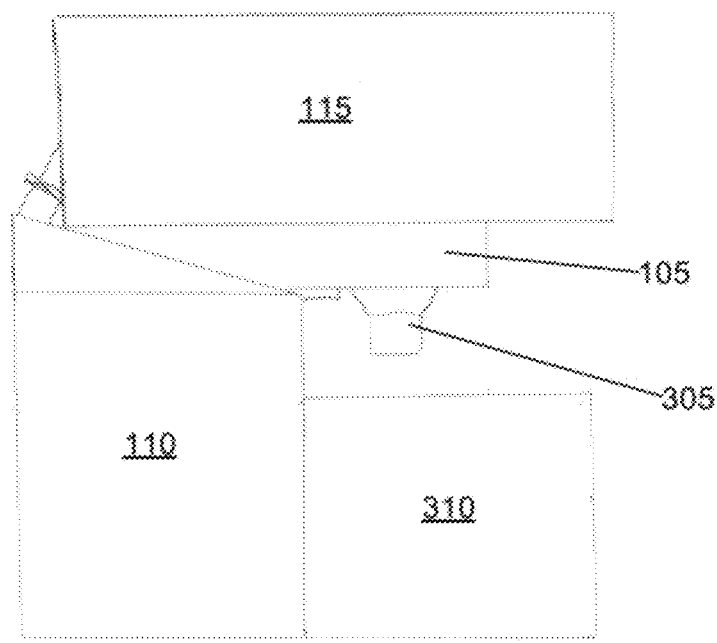

FIGS. 3A, 3B, 3C, and 3D illustrate an exemplary layout for the components of a plant oil extraction apparatus, in accordance with an embodiment of the present invention. FIG. 3A is a front perspective view. FIG. 3B is a diagrammatic left side view. FIG. 3C is a diagrammatic rear view, and FIG. 3D is a diagrammatic right side view. In the present embodiment, agitator tank 105 may be placed above reservoir tank 101 so that solvent in reservoir tank 101 may be pumped up into agitator tank 105. Boiler tank 110 may be placed lower than agitator tank 105 so that the solvent/plant oil solution can flow from agitator tank 105 to boiler tank 110 by gravity. Finally, condenser 115 may be placed above boiler tank 110 to capture solvent vapor rising from the top of boiler tank 110. Referring to FIG. 3C, solvent vapor that enters condenser 115 and is converted into liquid solvent may return to reservoir tank 101 by gravity through a return tube 301. Additionally, agitator tank 105 may be mounted on rubber pads or other similar means for isolating the vibrations of the ultrasonic generator in agitator tank 105. Referring to FIG. 3D, an open area 310 near boiler 110 may be used to hold electronic components, system controls, indicator lights, a user interface, a power source such as, but not limited to, a generator or batteries, storage space, etc. This layout may allow for the efficient movement of the solvent and plant oil through the apparatus along with the efficient use of space. Those skilled in the art will readily recognize, in light of and in accordance with the teachings of the present invention, that the components in some alternate embodiments may be configured in a multiplicity of suitable layouts. For example, without limitation, agitator tank 105 and condenser 115 may be oriented perpendicular to reservoir tank 101 rather than parallel to reservoir tank 101 with boiler tank placed under the ends of agitator tank 105 and condenser opposite from the ends over reservoir tank 101. The sight glass 425 may pass to the front of apparatus rather than be located at the side or rear. The control panel may be located at the front of the apparatus rather than the top. Rather than an internal solvent recycling system the fluid from an external separator is placed in a boiler that sends the vapor to a condensator starting above the boiler and draining next to the boiler back into bottles.

Figure 3E:
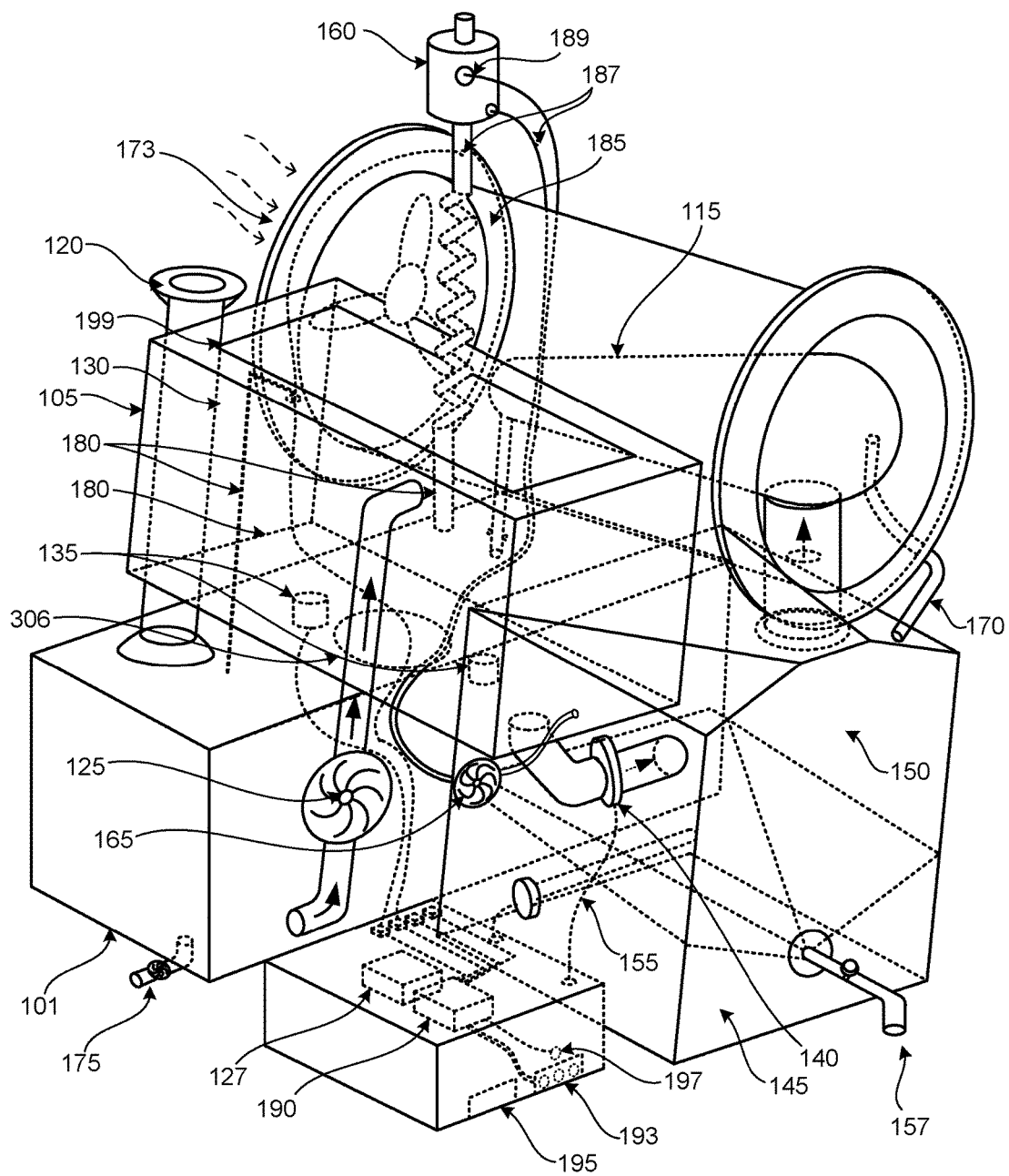
FIG. 3E illustrates a 3D cut-away view of an exemplary system implementation of FIGS. 3A to 3D.

FIG. 3E illustrates a 3D cut-away view of an exemplary system implementation of FIGS. 3A to 3D. Agitator heater 306 heats solvent to assist extraction process as well as preheating solvent to assist boiler process. By heating the solvent, the solvent can help penetrate the plant cells for maximum extraction. Once the pre-heated solution enters the boiler it will be more quickly brought up to desired temperature for the condensing process.

Figure 4A:
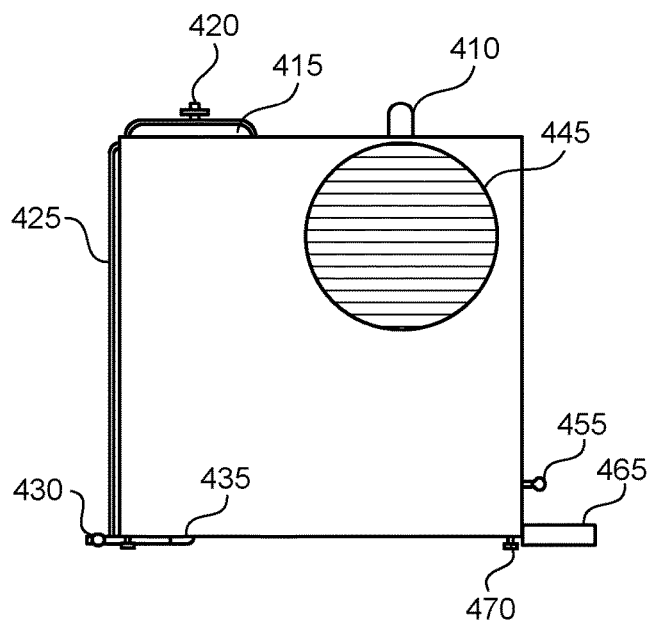
FIGS. 4A, 4B, 4C, 4D, and 4E illustrate an exemplary housing for a plant oil extraction apparatus, in accordance with an embodiment of the present invention.
Figure 4B:
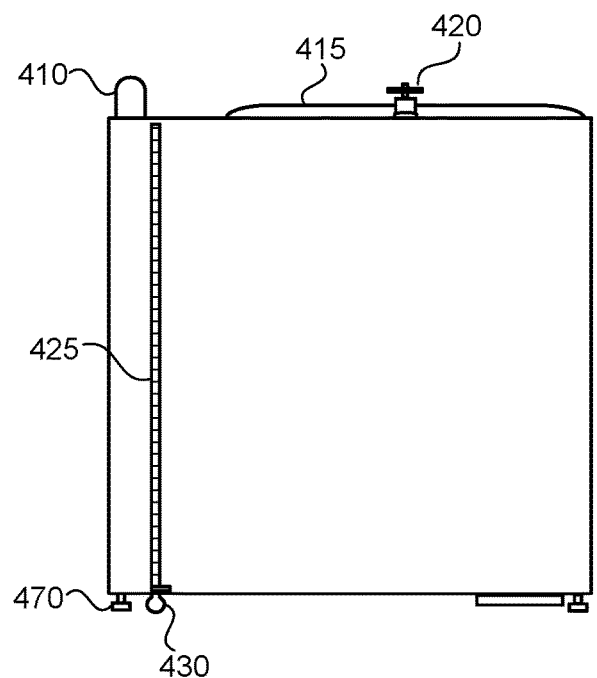
Figure 4C:
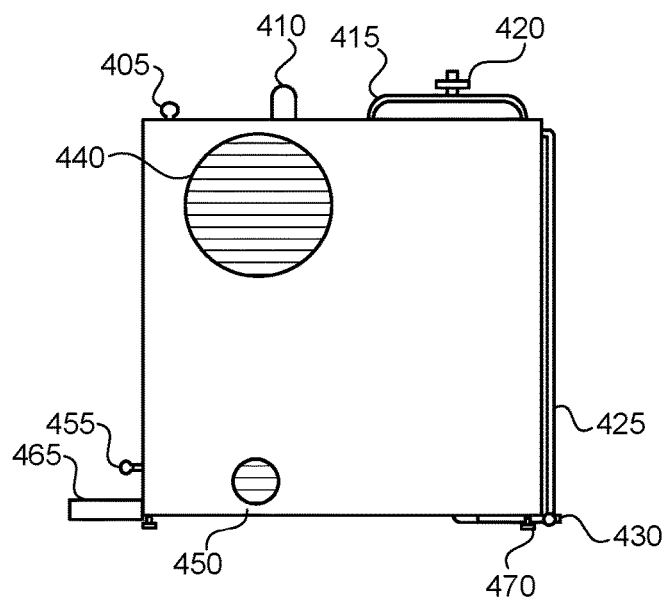
Figure 4D:
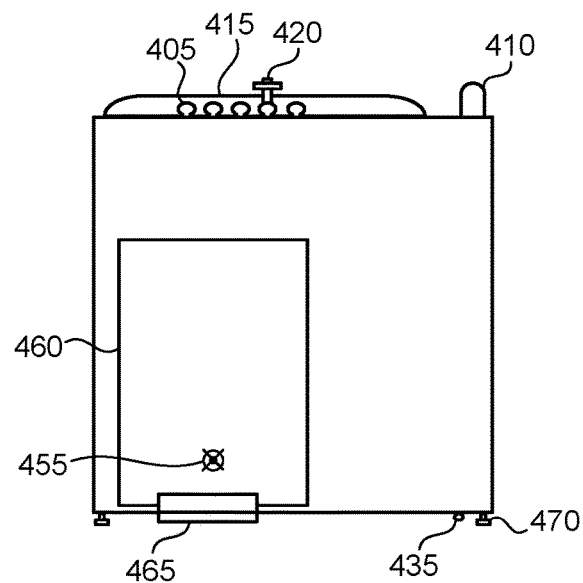
Figure 4E:
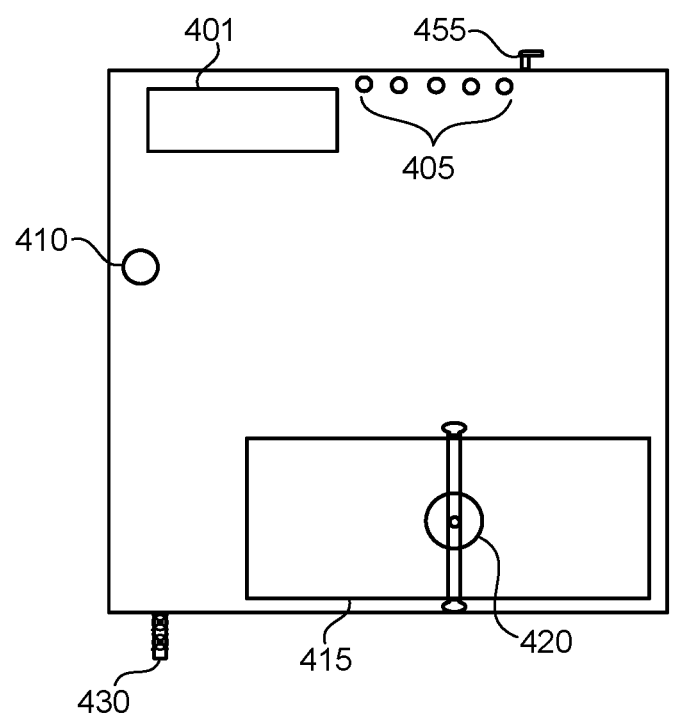

FIGS. 4A, 4B, 4C, 4D, and 4E illustrate an exemplary housing for a plant oil extraction apparatus, in accordance with an embodiment of the present invention. FIG. 4A is a diagrammatic front view. FIG. 4B is a diagrammatic left side view. FIG. 4C is a diagrammatic rear view. FIG. 4D is a diagrammatic right side view, and FIG. 4E is a diagrammatic top view. In the present embodiment, the plant oil extraction apparatus may be contained in a small box as the housing. Referring to FIG. 4E, a micro controller may enable a user to control the internal functions of the apparatus using an external control panel 401. Control panel 401 may comprise a multiplicity of suitable controls such as, but not limited to, an on/off switch or button, a start button, temperature controls, timers, data input means, etc. Multiple indicator lights 405 may also be placed on the housing to convey information to the user such as, but not limited to, which cycle is being performed, when the cycles are finished, if the heating element is on or off, etc. A vent 410 from the internal burn-off box may also be placed on the top portion of the housing to typically enable the system to relieve pressure that may build-up within. Optionally, vent 410 may be transparent to enable the user to see when the heating element within the burn-off box is activated. A lid 415 may give the user access to the agitator tank for adding the plant matter. Lid 415 may comprise locking means 420 such as, but not limited to, latches or clamps to typically ensure that lid 415 is securely closed. Locking means 420 may comprise sensors that detect whether or not lid 415 is secured so that the apparatus is ready to start. In some embodiments displays or indicator lights may also be included, without limitation, to indicate to the user when 415 is locked. For example, without limitation, if locking means 420 is not engaged, the display or indicator light may signify that locking means 420 are not latched, and the micro controller may prevent the apparatus from starting until lid 415 is closed properly. In the present embodiment, a graduated sight tube 425 may be placed on the housing to enable the user to check the amount of solvent in the reservoir tank. It is contemplated that some embodiments may be implemented without a sight tube for the reservoir tank or with various different means for checking the level of the solvent such as, but not limited to, an electronic sensor that displays the solvent level on a user interface. There is a fill port on the reservoir tank. In the present embodiment, a reservoir drain 430 may be located near the bottom of the housing to typically enable the reservoir tank to be drained, for example, without limitation, for cleaning or replacing the solvent. Referring to FIGS. 4A and 4D, a feed 435 may lead from the lower portion of the reservoir tank to a pump to transfer solvent from the reservoir tank to the agitator tank.

Referring to FIG. 4C, a fan 440 may provide fresh air to the condenser to aid in cooling solvent vapor in the condenser and converting the solvent back to a liquid state. In some embodiments a filter may be placed on the fan to help prevent dust or other debris from being pulled into the condenser by fan 440. Some embodiments may also comprise a cage or guard around the fan for safety. Referring to FIG. 4A, an exhaust vent 445 may enable the air pulled into the condenser by fan 440 to escape the apparatus. The backside of the housing may also comprise an electronics air filter 450. The purpose of the filter is to keep dust and dirt from affecting the performance or efficiency of the components.

In the present embodiment, a boiler valve 455 protrudes from the outside of the housing to typically enable the user to drain the extracted plant oil from the boiler into a container for use once the apparatus has completed the extraction process. Referring to FIG. 4D, the user may access the boiler with a slide out drawer 460 in the side of the housing. In some embodiments a sliding or hinged door may be used for boiler access rather than a drawer. Optionally, a removable hot plate 465 may be placed under the boiler valve to maintain a temperature high enough to help prevent the plant oil from solidifying. Optionally, because hot plate 465 is removable, hot plate 465 may also be used to warm a secondary container into which the plant oil may be emptied to help keep the plant oil minimally viscous for removal from the secondary container for use. In some embodiments this temperature may be maintained by a heating element in the boiler. Other alternate embodiments may comprise an integrated secondary container with or without heating means into which the oil in the boiler may automatically drain after or during the boiling process. The user may then access the oil in this container by a drain, access door, etc. In the present embodiment, leveling feet 470 may be placed on the bottom of the housing so that the level of the apparatus as a whole may be adjusted.

Those skilled in the art will readily recognize, in light of and in accordance with the teachings of the present invention, that a multiplicity of suitable additional or alternate features may be incorporated into the housings of some embodiments such as, but not limited to, transparent windows for viewing the process, a display screen, control knobs, control switches, control buttons, control dials, indication lights, multiple vents for releasing heat, access door for components that may need to be changed for maintenance purposes (such as filters), USB or other external computer connection for advanced system control and monitoring, etc. It is contemplated that extraction apparatuses may be implemented in various different shapes and sizes.

For example, without limitation, a small "tabletop" apparatus may be implemented for home use. This embodiment may comprise handles for ease of movement to typically enable the user to store the apparatus when not in use. Some larger embodiments may be implemented for use in a shed, basement, garage, etc. Yet other larger embodiments may be implemented for use in production facilities of various different sizes.

Figure 5:
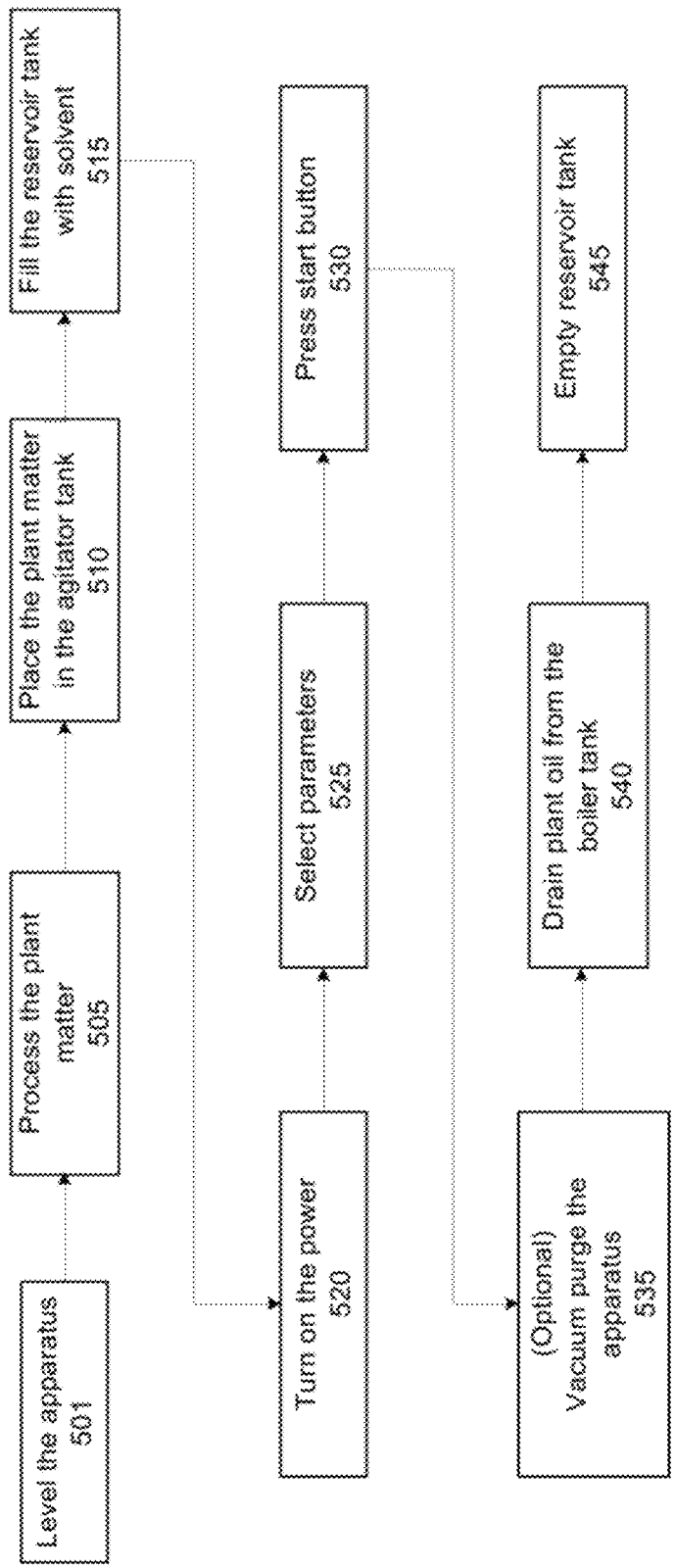
FIG. 5 is a flow chart illustrating an exemplary process for using a plant oil extraction apparatus, in accordance with an embodiment of the present invention.

FIG. 5 is a flow chart illustrating an exemplary process for using a plant oil extraction apparatus, in accordance with an embodiment of the present invention. In the present embodiment, the extraction of the plant oil may be accomplished with an easy to use fully automated process using the extraction apparatus. The apparatus may be used for solvent based plant oil extraction in consumer or small facility use. Some embodiments may be configured for use in larger applications. In the present embodiment, the process begins at step 501 in which the user places the apparatus on a level surface. If the apparatus comprises leveling feet, the user may adjust these leveling feet to help ensure that the apparatus is uniformly level. In step 505, the user may process the plant matter. For example, without limitation, some plant material should typically be dried and reduced to small pieces. It is contemplated that the preparation of the plant matter may depend on the type of plant being used. Then, the prepared plant mater may be put in the agitator tank in step 510. In some embodiments, the plant matter may be put in a filter bag and placed within the agitator tank. In step 515 the reservoir tank may be filled with solvent if the reservoir tank is not already sufficiently full. The user may determine the solvent level within the reservoir tank by checking a sight tube on the side of the apparatus. Alternatively, a dipstick may be placed in the reservoir tank to check the solvent level or the user may open the reservoir tank to check the solvent level. In step 520, the user may turn the apparatus power on if the apparatus is not already turned on. The user may select parameters for the process using a control panel and user interface on the apparatus in step 525. Alternatively, the apparatus may be controlled by remote control such as a remote control, Smartphone with Bluetooth capabilities or directly from the internet via Wi-Fi, Chosen parameters may include, without limitation, type of solvent (for calibration of sensors and temperatures), a heat range, the number of cycles, timing, etc. These parameters may depend on various different factors such as, but not limited to, the unique plant material being used, ambient temperature and humidity, the intended use for the plant oil, etc. It is contemplated that some embodiments may comprise a programmable user interface that may enable the user to preprogram system parameters for specific circumstances if desired. In these embodiments the user may simply choose the appropriate preprogrammed set of parameters and start the apparatus rather than choosing each individual parameter before starting the apparatus. Once the parameters are set, the user may press start button or other control means, for example, without limitation, a lever or switch, to start the apparatus in step 530. The apparatus then automatically runs through the preset number of cycles for the extraction of oil from the particular plant matter being used with the micro controller actuating solenoid valves, heating elements, and other controls to perform each step of the extraction process. Alternatively, some embodiments may incorporate some steps that are not automated and which are performed by the user. For example, without limitation, in some embodiments, the user may manually pump the solvent into the agitator tank with a hand pump or motorized pump. In the present embodiment, after the cycles are complete, the user may choose to vacuum purge the apparatus in step 535 if the particular apparatus comprises vacuum release means. If this step is performed, the boiler tank may be used as a vacuum chamber that draws residual solvents from the extracted plant oil. In step 540 the user may drain the plant oil from the boiler tank into a container. Optionally, this container may be placed onto a hot plate set to a desired temperature to keep the plant oil minimally viscous for transfer to desired final containment. Finally, in step 545, the user may empty the reservoir tank into a solvent container by way of a drain valve for later use. In some applications, the user may leave the solvent in the reservoir tank to be used again. Those skilled in the art will readily recognize, in light of and in accordance with the teachings of the present invention, that the user may perform additional steps in some embodiments depending on the features of the apparatus, the particular application, environmental conditions, etc. After the process is finished the boiler can be slid out and top part removed for easy access for cleaning (so that cross contamination of oil can be eliminated). The inside of the boiler can have a coating to also aid in cleaning. (ceramic, Teflon, or some other nonstick surface).

Some embodiments of the present invention may enable the user to make oils from plants grown in garden, which may be less costly than buying consumer plant oils. Furthermore, these embodiments typically enable the user to have complete knowledge of the content of the plant oil. For example, without limitation, some embodiments may allow a home owner to garden their own herbs for extraction with the knowledge that no herbicides, insecticides, or other outside products may end up in the extracted oil. Products or processes that can use or incorporate plant oils extracted by this process may include, without limitation, medicinal products that utilize plant oils, health products that utilize plant oils, beauty products that utilize plant oils, food/beverage products that utilize plant oils, skincare products that utilize plant oil extracts, recreational use of plant oil extracts, cleaning products utilizing plant oils, scented candles or sprays utilizing plant oils, etc.

A relatively simple embodiment of the present invention may comprise an agitator tank into which plant material and solvent may be placed to separate oils from plant matter. The oil/solvent from the agitator tank may then be poured through a filter into a boiler tank to boil off the solvent, thus leaving the oil behind for further use. It is contemplated that a multiplicity of suitable additional or alternative features may be incorporated into some embodiments such as, but not limited to, scraping or pressing means in the boiler to help maximize the amount of oil obtained from the boiler, manual overrides of some of the automated processes, etc.

Those skilled in the art will readily recognize, in light of and in accordance with the teachings of the present invention, that any of the foregoing steps may be suitably replaced, reordered, or removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3rd parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing a plant oil extraction apparatus according to the present invention will be apparent to those skilled in the art. Various aspects of the invention have been described above by way of illustration, and the specific embodiments disclosed are not intended to limit the invention to the particular forms disclosed. The particular implementation of the plant oil extraction apparatus may vary depending upon the particular context or application. By way of example, and not limitation, the extraction apparatuses described in the foregoing were principally directed to implementations for processing plant matter; however, similar techniques may instead be applied to apparatuses for extracting oil from non-plant materials, distilling apparatuses, or fermentation apparatuses, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system comprising:
    a reservoir tank, said reservoir tank comprising a fill port for receiving a solvent, said reservoir tank being configured for holding said solvent, wherein said solvent is deposited into said reservoir tank through said fill port;
    an agitator tank, said agitator tank comprising an ultrasonic generator being operable to generally vibrate a mixture of at least a plant material and at least a portion said solvent, wherein said agitator tank is configured to substantially extract oil from said plant material;

a boiler tank, said boiler tank comprising an oil chamber configured to heat an ancillary oil in approximately safe and controlled uniform heat, in which said boiler tank further comprising a solution chamber configured for receiving at least a portion of a mixture of extracted oil and said solvent;

said oil chamber is in a generally bottom portion of said boiler tank and said solution chamber is in a generally top portion of said boiler tank generally forming a boiler tank stack, wherein a heated ancillary oil is imparted to at least an entire bottom portion of said solution chamber to heat and substantially separate said received extracted oil and solvent;

a condenser unit, said condenser unit is configured to substantially condense vapor produced from said boiler tank back into a liquid form and flowed into said reservoir tank for reuse;

a venting apparatus, said venting apparatus is configured to generally relieve any pressure that accumulates in the system, wherein said venting system generally connects said agitator tank and said condenser unit to said reservoir tank; and a burn-off box, wherein said venting apparatus further connects said reservoir tank to said burn-off box, in which said burn-off box is operable to burn off solvent fumes before escaping to an atmosphere outside of said system.

2. The system of claim 1, in which said reservoir tank further comprising a fill port sensor coupled to said fill port, wherein said fill port sensor is configured to indicate whether said fill port is open or closed, and in which said fill port further comprising a sight glass and fill level sensor, and wherein said sight glass and fill level sensor are configured to determine a solvent fill level.

3. The system of claim 1, further comprising a pump, wherein said pump is configured to transfer said at least a portion of solvent from said reservoir tank to said agitator tank.

4. The system of claim 3, further comprising a level sensor configured to send a signal to said pump to stop once said agitator tank is filled to a predetermined level.

5. The system of claim 1, in which said boiler tank further comprising at least an ancillary oil heating element and a temperature sensor, wherein said oil chamber is filled with said ancillary oil and said ancillary oil heating element is submerged in said ancillary oil, and wherein said ancillary oil heating element and temperature sensor are configured to heat said ancillary oil in approximately safe and controlled uniform heat.

6. The system of claim 4, wherein received extracted oil and solvent is brought to a boil with said heat coming from said oil chamber, in which said boiler tank further comprising a top port for venting vapor from said heated extracted oil and solvent.

7. The system of claim 1, wherein said vapor from the boiler tank enters said condenser unit through an entry port, then, as said vapor substantially condenses into said liquid form, said liquid is configured to flow down a sloped interior of said condenser unit to an exit port and into said reservoir tank through a return tube.

8. The system of claim 1, in which said venting apparatus comprising a venting tube, said vending tube connects said agitator tank and said condenser unit to said reservoir tank and into said burn-off box at an end of said venting apparatus to provide a closed venting apparatus.

9. The system of claim 8, in which said vent tubing further comprising a condensation coil in a condenser portion configured to trap solvent fumes and enable the solvent fumes to condense and returned to said reservoir tank.

10. The system of claim 1, in which said burn-off box comprises a small box surrounded by fire walls.

11. The system of claim 1, in which said burn-off box further comprises a solvent heating element operable to be ignited to burn off said solvent fumes before escaping to said atmosphere outside of said system.

12. The system of claim 1, further comprising a micro controller to control systems functions and enable an automated plant oil extraction system.

13. A system comprising:
means for receiving a solvent;
means for storing said solvent, wherein said solvent is deposited into said storing means through said receiving means;
means for vibrating a mixture of at least a plant material and at least a portion of said solvent, wherein said vibrating means is configured to substantially extract oil from said plant material;
means for heating an ancillary oil in approximately safe and controlled uniform heat;
means for holding at least a portion of a mixture of extracted oil and said solvent;
means for stacking said heating means and holding means, wherein said heating means is in a generally bottom portion of said stacking means, and wherein said holding means is in a generally top portion of said stacking means, in which said heated ancillary oil is imparted to at least an entire bottom portion of said holding means to heat and substantially separate said extracted oil and solvent;
means for condensing vapor produced from said stacking means back into a liquid form and flowed into said storing means for reuse;
means for venting pressure that accumulates in the system, wherein said venting means generally connects said stacking means and said condensing means to said storing means; and
means for burning off solvent fumes before escaping to an atmosphere outside of said system, wherein said venting means further connects said storing means to said means for burning off solvent fumes.

14. The system of claim 13, further comprising means for transferring said solvent from said storing means to said vibrating means.

15. The system of claim 13, further comprising means for filtering said plant material from said solvent.

16. The system of claim 13, further comprising means for allowing internal expansion and contraction of air inside the system.

17. A method comprising the steps of:
receiving a solvent;
storing said solvent, wherein said solvent is deposited into a storing means through said receiving step;
receiving at least a plant material and at least a portion of said stored solvent;
vibrating said plant material and at least a portion of said stored solvent, wherein said vibrating step is configured to substantially extract oil from said plant material;
heating an ancillary oil in approximately safe and controlled uniform heat;
holding at least a portion of a mixture of extracted oil and said solvent;

separating said extracted oil and solvent, in which said heated ancillary oil is imparted to at least an entire bottom portion of a holding means to heat said extracted oil and solvent;

condensing vapor produced from said heating step into a liquid form and flowed into said storing means for reuse;

relieving pressure that accumulates in the system, wherein a venting means generally connects a stacking means and a condensing means to said storing means; and burning off solvent fumes before escaping to an atmosphere outside of said system, wherein said venting means further connects said storing means to a burning means for burning off solvent fumes.

18. The method of claim 17, further comprising the step of transferring said solvent from said storing means to said holding means.

19. The method of claim 17, further comprising the step of filtering said plant material from said solvent.

20. The method of claim 17, further comprising the step of heating said ancillary oil in approximately safe and controlled uniform heat.

21. The method of claim 17, further comprising the step of converting said solvent tank into a vacuum chamber, and extracting residual solvent from extracted oil using a vacuum pump.

* * * * *